Patented Jan. 24, 1939

2,145,050

UNITED STATES PATENT OFFICE 2,145,050

PRODUCTION OF SYNTHETIC RESINS

Adolf Hodler, Ludwigshafen-on-the-Rhine, Germany, assignor to I. G. Farbenindustrie Aktiengesellschaft, Frankfort-on-the-Main, Germany No Drawing. Application March 9, 1937, Serial No. 129,815. In Germany March 28, 1936

8 Claims. (Cl. 260—72)

The present invention relates to a process of producing synthetic resins.

It has already been proposed to condense aliphatic aldehydes, as for example acetaldehyde, aldol, crotonaldehyde and the like, in the presence of primary or secondary amines to form a mixture of oils and resins. The resins thus obtained have, however, disadvantages, as for example sticking when polished, dark color, disappearance of the lustre and comparatively slight resistance to water, which impair their use in practice.

I have now found that valuable synthetic resins are obtained by condensing aliphatic aldehydes containing from 2 to 4 carbon atoms by means of small amounts of primary or secondary alkylamines or aralkylamines or secondary heterocyclic bases or their salts with weak acids as catalyst, the resulting resinous products being treated with formaldehyde or substances yielding formaldehyde, if desired in the presence of oxidizing agents, at temperatures of up to 250° C. before, during or after distilling off of the readily volatile oils simultaneously formed.

The treatment with formaldehyde or agents yielding formaldehyde may also be effected with said aldehyde resins which have already been subjected to an improving treatment, as for example a treatment with organic acids or inorganic halides having a condensing action, the concentration of the oxidizing agents which may be present should be selected so that for each molecular proportion of formaldehyde there is present at the most 1 molecular proportion of oxidation oxygen.

In spite of the use of oxidizing agents no burning or dark coloration takes place in the presence of excess of formaldehyde, even at high temperatures, but on the contrary a considerable lightening in color and improvement of the resin takes place.

As aliphatic aldehydes containing from 2 to 4 carbon atoms may be mentioned acetaldehyde, aldol, crotonaldehyde or mixtures of these with each other. Small amounts of other organic substances, such as alcohols, in particular polyhydric alcohols, ketones, as for example acetone or diacetyl, ketone or hydroxy acids, esters or resin acids, such as colophony or the various abietic acids contained therein may be condensed together with the said aldehydes. Primary or secondary alkylamines, aralkylamines or secondary heterocyclic bases or their salts with weak acids suitable for the present process are for example methylamine, ethylamine, butylamine, benzylamine and the corresponding diamines or piperidine as well as their salts with acetic acid, propionic acid, butyric acid, glycolic and lactic acid.

As oxidizing agents there may be mentioned in particular peroxides, as for example hydrogen peroxide, benzoylperoxide, peracetic acid, sodium persulphate. Air or oxygen may, however, also be used as oxidizing agents, for example by allowing them to act on the resins together with the formaldehyde. The oxidizing agents and the formaldehyde or substances yielding formaldehyde, such as paraformaldehyde and hexamethylene tetramine, may be used in the vapour phase or in dissolved form and the resin to be treated may be in the fused or dissolved form.

The products thus obtained have especially good properties. They are clear, transparent and of excellent hardness. They are readily soluble to give clear solutions in most resin and lacquer solvents and thus have in practice a great number of uses. For example alone or together with nitrocellulose they yield entirely transparent, solid films. Alone or in admixture with nitrocellulose they may be polished similarly to shellac and yield an excellent, highly lustrous, extremely hard and stable polish. They may therefore be used instead of shellac. By reason of the fact that the treatment with formaldehyde is usually attended by a lightening in the color, they are also suitable as polishing agents for quite pale types of wood. The products are also soluble in drying oils, as for example linseed oil, and yield clear and hard films with the same.

The following examples will further illustrate how the present invention may be carried out in practice but the invention is not restricted to these examples. The parts are by weight.

*Example 1*

43 parts of diethylamine are slowly introduced into 700 parts of acetaldehyde while cooling under reflux. Reaction takes place with evolution of heat and the temperature of the mixture rises within 1 hour to 100° C. The mixture is then boiled for 2 hours at 100° C. After cooling the crude resinous condensation product is separated from the water formed and treated for two hours at 100° C. with 295 parts of 30 per cent aqueous formaldehyde solution. After removing the aqueous and oily fractions by distilling the mixture up to 220° C., there remain 400 parts of hard resin. This is readily soluble in alcohol and by polishing yields polishes of excellent hardness and excellent gloss.

Example 2

700 parts of acetaldehyde are stirred into a mixture of 450 parts of water, 15 parts of acetoacetic acid ester, 43 parts of diethylamine and 75 parts of abietinol and heated for 5 hours at 100° C. Water and small amounts of oil simultaneously formed are distilled off by heating to 220° C. After cooling, the resulting resinous crude product is treated for an hour with 190 parts of aqueous 30 per cent fomaldehyde solution. The constituents of low boiling point present are distilled off by a repeated heating to 220° C. 390 parts of pale, hard resin remain as a residue.

This dissolves readily in alcohol and may be polished like shellac. The polish has a high gloss and is of great hardness and stability. The resin also yields excellent polishes in admixture with nitrocellulose. It is also soluble in linseed oil, for example in the proportions 1:1, and may be applied to substrata as an oil lacquer by the use of diluents, as for example lacquer benzine.

Example 3

750 parts of acetaldehyde are slowly introduced into a mixture of 500 parts of water, 40 parts of abietinol, 40 parts of glycerine and 45 parts of diethylamine. The mixture is then treated further as described in Example 1. The crude resinous condensation product obtained is boiled with 65 parts of anhydrous formic acid for half an hour. The readily volatile constituents are distilled off while heating up to 220° C. 500 parts of a dark yellow resin are thus obtained. This resin is treated for 4 hours at 100° C. with 150 parts of 30 per cent formaldehyde solution. After separating the aqueous and oily constituents by heating to 220° C., there remain 470 parts of a pale, amber-colored, clear, transparent resin having a softening point of 73° C. The resin is harder and paler than the above resin having a softening point of 63° C. It dissolves in alcohol giving a pale yellow coloration and yields therefrom, when polished on pale wood, excellent, entirely pale, hard polishes of high lustre.

Example 4

705 parts of acetaldehyde are slowly introduced into a mixture of 100 parts of a 50 per cent aqueous glycerine solution, 15 parts of aceto-acetic acid ethyl ester and 42 parts of diethylamine. The mixture is boiled under reflux for 5 hours. After cooling the reaction product is separated from the water and treated with 78 parts of anhydrous formic acid for half an hour at 100° C. The readily volatile constituents are distilled off while heating up to 250° C. Gaseous formaldehyde is then led in at the same temperature at the rate of 0.25 part per minute for an hour. In this way 460 parts of a pale resin are obtained which in alcoholic solution either alone or in conjunction with nitrocellulose is eminently suitable for polishing and yields polishes of high gloss and great hardness.

Example 5

783 parts of vapors of acetaldehyde are led into a mixture of 500 parts of water and 43 parts of piperidine. The crude resinous condensation product obtained after boiling the mixture for 5 hours is freed from the readily volatile constituents by heating up to 220° C. and treated for 1 hour with vapors of formaldehyde, 0.8 part each minute. 480 parts of a resin are obtained which dissolves readily in alcohol and is capable of being polished either alone or in combination with nitrocellulose.

Example 6

60 parts of vapors of formaldehyde diluted with nitrogen are introduced in the course of 1 hour at 200° C. into 2400 parts of a fused resin obtained by boiling a mixture of 3800 parts of acetaldehyde and 200 parts of diethylamine under reflux for 2 hours, treating the resulting condensation product with 400 parts of formic acid for half an hour at 100° C. and distilling off the volatile constituents while heating up to 220° C. 2400 parts of a pale, hard resin having a softening point of 71° C. are obtained. The resin is soluble in alcohol and capable of being polished like shellac, either alone or in combination with nitrocellulose.

Example 7

2440 parts of acetaldehyde are slowly introduced into 280 parts of a 50 per cent aqueous solution of diethylamine and the whole is boiled under reflux for 2 hours. After cooling, the resulting resinous condensation product is separated from the water and freed from the volatile constituents by heating up to 110° C. A mixture of vapors of 30 parts of formaldehyde and 50 parts of formic acid are blown in in the course of 1 hour while increasing the temperature from 110° to 220° C.

620 parts of a pale, hard resin are thus obtained. It is capable of being polished yielding polishes of high lustre.

When employing monomethylamine, dimethylamine, dibutylamine or benzylamine or their salts with weak acids as condensing agents instead of diethylamine resins having similar properties are obtained.

Example 8

800 parts of a resin still containing water (which has been prepared by boiling a mixture of 2440 parts of acetaldehyde and 140 parts of diethylamine in aqueous solution under reflux for 2 hours and removing the major portion of the water) are boiled for an hour with a mixture of 56 parts of a 20 per cent aqueous solution of hydrogen peroxide and 55 parts of a 30 per cent aqueous solution of formaldehyde under reflux. The whole is then heated to 220° C. while distilling off the fraction of low boiling point, a mixture of a further 56 parts of the hydrogen peroxide solution and 88 parts of the formaldehyde solution being simultaneously introduced into the resin melt.

420 parts of a pale resin are obtained which is well soluble in alcohol and nitrocellulose solutions and which is eminently capable of being polished either alone or together with nitrocellulose.

Example 9

2250 parts of acetaldehyde are stirred during the course of an hour into a mixture of 500 parts of water, 250 parts of glycerine and 140 parts of diethylamine. The mixture is boiled under reflux for 5 hours and then, after adding a mixture of 390 parts of an aqueous 30 per cent solution of formaldehyde and 33 parts of an aqueous 30 per cent solution of hydrogen peroxide, for another hour. After separating the major portion of the water, the constituents of low boiling point still present (the remainder of the water and oils) are distilled off up to 250° C. while at the same time there is added a mixture of 330 parts of an aqueous 30 per cent formaldehyde solution and 100 parts of an aqueous 30 per cent hydrogen peroxide solution.

1260 parts of a pale resin are obtained which is eminently capable of being polished for example together with nitrocellulose.

What I claim is:

1. A process of producing synthetic resins, which comprises condensing aliphatic aldehydes containing from 2 to 4 carbon atoms by means of small amounts of a substance of the group of primary and secondary alkyl and aralkylamines, secondary heterocyclic bases and their salts with weak acids as catalyst and treating the resulting resinous products with formaldehyde at temperatures of up to 250° C.

2. A process of producing synthetic resins, which comprises condensing aliphatic aldehydes containing from 2 to 4 carbon atoms in admixture with a polyvalent alcohol by means of small amounts of a substance of the groups of primary and secondary alkyl and aralkylamines, secondary heterocyclic bases and their salts with weak acids as catalyst and treating the resulting resinous products with formaldehyde at temperatures of up to 250° C.

3. A process of producing synthetic resins, which comprises condensing aliphatic aldehydes containing from 2 to 4 carbon atoms in admixture with a resin acid by means of small amounts of a substance of the group of primary and secondary alkyl and aralkylamines, secondary heterocyclic bases and their salts with weak acids as catalyst and treating the resulting resinous products with formaldehyde at temperatures of up to 250° C.

4. A process of producing synthetic resins, which comprises condensing aliphatic aldehydes containing from 2 to 4 carbon atoms by means of a substance of the group of primary and secondary alkyl and aralkylamines, secondary heterocyclic bases and their salts with weak acids and treating the resulting resinous products with formaldehyde and an oxidizing agent at temperatures of up to 250° C.

5. A process of producing synthetic resins, which comprises condensing aliphatic aldehydes containing from 2 to 4 carbon atoms by means of small amounts of diethylamine as catalyst and treating the resulting resinous products with formaldehyde at temperatures of up to 250° C.

6. A process of producing synthetic resins, which comprises condensing aliphatic aldehydes containing from 2 to 4 carbon atoms by means of diethylamine and treating the resulting resinous products with formaldehyde and hydrogen peroxide at temperatures of up to 250° C.

7. Synthetic resins obtained according to the process of claim 1, said resins being soluble in resin and lacquer solvents and being capable of being polished similar to shellac.

8. Synthetic resins obtained according to the process of claim 5, said resins being soluble in alcohol and being capable of taking a polish similar to shellac.

ADOLF HODLER.